United States Patent [19] [11] 3,921,364
Briles [45] Nov. 25, 1975

[54] FASTENER WITH TAPERED SHANK AND DUAL TAPERED HEAD

[76] Inventor: Franklin S. Briles, 3600 Catamaran, Corona Del Mar, Calif. 92625

[22] Filed: July 15, 1974

[21] Appl. No.: 488,562

Related U.S. Application Data

[63] Continuation-in-part of Ser. No. 388,386, Aug. 15, 1973, Pat. No. 3,849,964.

[52] U.S. Cl. .................... 52/758 F; 85/1 R; 85/9 R; 85/43; 285/211
[51] Int. Cl.² ...................... F16B 35/06; F16B 5/00
[58] Field of Search ............. 29/509, 522, 525, 526; 52/617, 758 F; 85/1 R, 9 R, 37, 43; 403/388, 408; 285/211, 212

[56] References Cited
UNITED STATES PATENTS

| 2,833,325 | 5/1958 | Laisy | 85/9 R |
| 3,034,611 | 5/1962 | Zenzic | 403/408 |
| 3,298,270 | 1/1967 | Launay | 85/50 R X |
| 3,516,699 | 6/1970 | Bergere | 85/37 X |
| 3,680,429 | 8/1972 | Briles | 85/37 |
| 3,682,508 | 8/1972 | Briles | 151/41.73 X |
| 3,748,948 | 7/1973 | Schmitt | 85/37 X |
| 3,828,422 | 8/1974 | Schmitt | 29/525 |
| 3,840,980 | 10/1974 | Auriol | 29/522 |

FOREIGN PATENTS OR APPLICATIONS

| 29,802 | 12/1969 | Japan | 85/9 R |
| 997,733 | 7/1965 | United Kingdom | 85/9 R |

OTHER PUBLICATIONS

Screws, Bolts, and Nuts, p. 150, Handbook of Fastening and Joining of Metal Parts, 4/20/56.

Primary Examiner—Frank L. Abbott
Assistant Examiner—Leslie A. Braun
Attorney, Agent, or Firm—William W. Haefliger

[57] ABSTRACT

A fastener has a dual tapered head and a tapered shank configured to have such interference engagement with a work bore as to controllably minimize warpage of the work.

3 Claims, 8 Drawing Figures

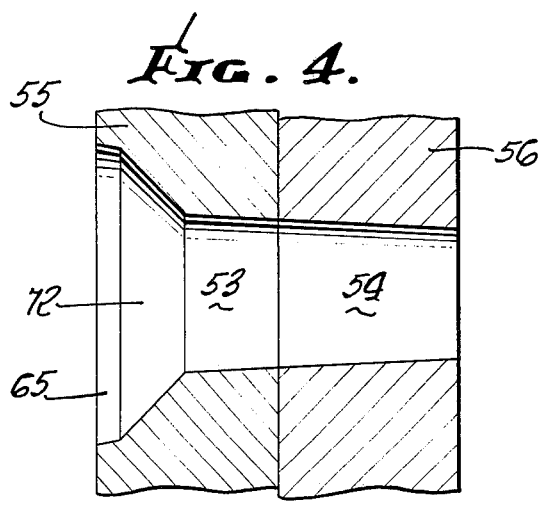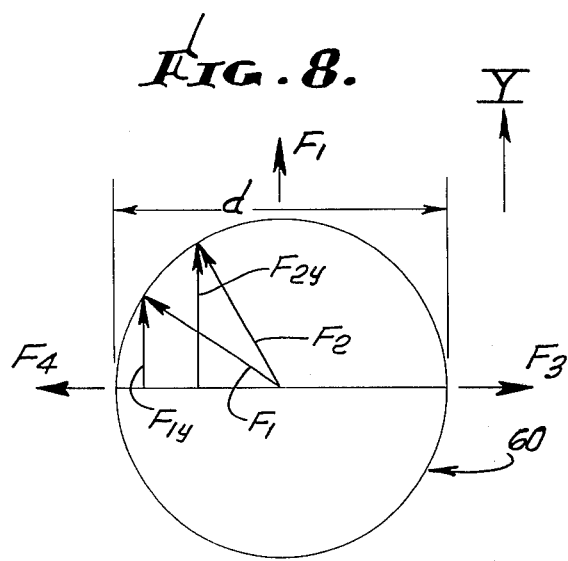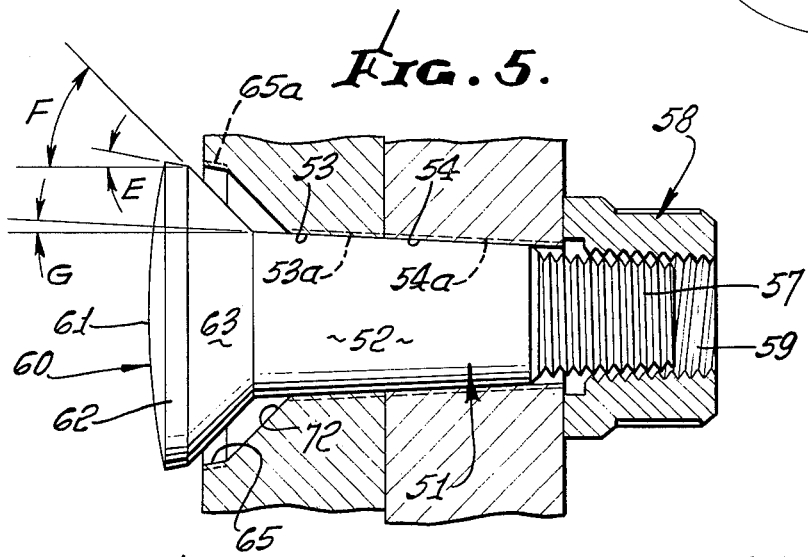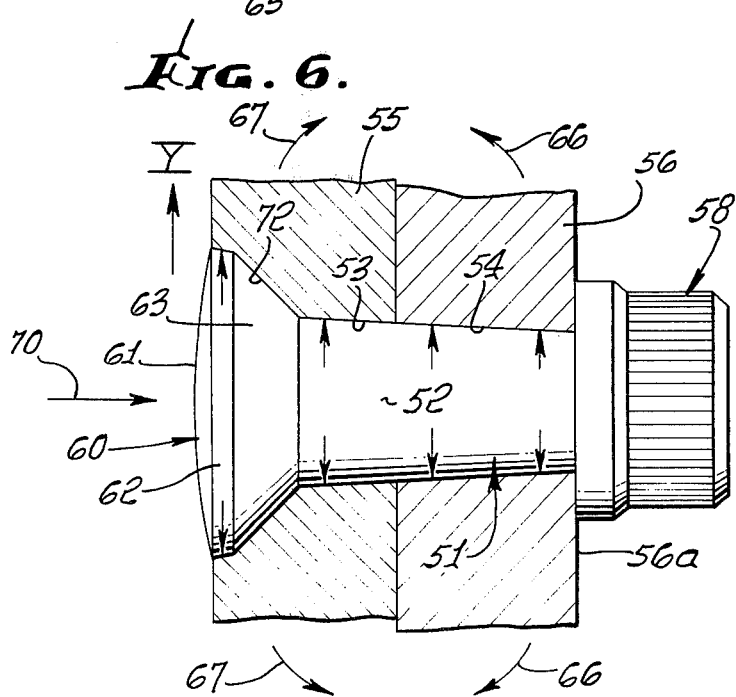

FASTENER WITH TAPERED SHANK AND DUAL TAPERED HEAD

BACKGROUND OF THE INVENTION

This application is a continuation-in-part of my prior application Ser. No. 388,386, filed Aug. 15, 1973, now U.S. Pat. No. 3,849,964.

This invention relates generally to angle headed fasteners, and more particularly concerns the construction of such fasteners to have specialized interference with the work to overcome problems and defects stemming from fastener head reception in work counterbore.

In the past, the use of angle headed fasteners to connect work panels, as for example aluminum or titanium panels as employed in aircraft structures, has given rise to numerous problems. Among these were the practice of providing countersunk holes in the work slightly oversize in relation to the outer edges of the received fastener heads. The required removal of such material to produce the oversize countersunk holes resulted in undesirable notch sensitivity and reduction of fatigue life of the structure. More importantly, corrosion problems developed; for example, protective material filled into annular recesses about the heads tended to work loose during flexing of aricraft structures, so that corrosive fluids could gain access to the work bore along the fastener length, weakening the structure by producing corrosion and stress corrosion. Also, since the fastener head periphery did not completely engage the work bore due to the oversize countersink relation, the development of desirable radial compression and peripheral tension in and within the elastic limits of the work material about the fastener head was not possible. Further, warpage of the work panels could and did occur where the fastener shank had interference engagement with panel bores. Also, warpage misaligns pre-drilled openings necessitating their re-drilling, which is detrimental to the structure.

SUMMARY OF THE INVENTION

It is a major object of the invention to provide a fastener capable of overcoming the above problems, and also providing unusual advantages as will appear.

One important aspect of the invention concerns the provision of a tapered shank fastener having a head which engages the work in a manner to minimize warpage of the work, and also to eliminate any warpage induced formation of a deleterious pocket or recess at the immediate periphery of the head, thereby to forestall corrosion that might otherwise develop as a result of collection of corrosive material in such a recess or pocket. Also, closer spacing of fasteners is thereby facilitated. In this regard, and as will be seen, the head may have first and second tapered sections proceeding forwardly from the rear face, and the taper angularity of the first section is made such as to have interference engagement with the counterbore along the length of the first section, providing radial compression and peripheral tension.

It is another object of the invention to provide a fastener, as above described, which has interference engagement with the work at spaced locations along its length, when fully advanced into the work, to provide counteracting moments acting oppositely on the work to minimize warpage. The invention also makes possible the design of closer edge margins and hole patterns in structures.

These and other objects and advantages of the invention, as well as the details of an illustrative embodiment, will be more fully understood from the following description and drawings, in which:

DRAWING DESCRIPTION

FIG. 4 is a side elevation showing a fastener opening drilled in a pair of panels to be interconnected;

FIG. 5 is a side elevation showing a fastener embodying the invention partly received into the opening; and FIG. 6 is a view like FIG. 5 showing the fastener fully received into the opening;

FIG. 7 is a section showing deflection of sheets interconnected by prior tapered shank fasteners; and FIG. 8 is a force diagram.

DETAILED DESCRIPTION

Figure 1:
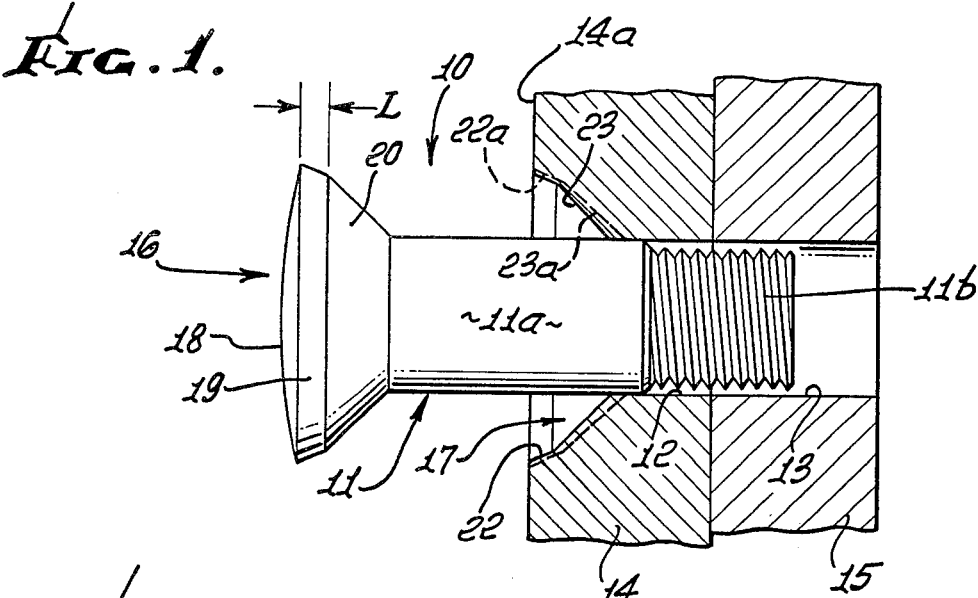
FIG. 1 is a side elevation showing a fastener embodying the invention as it is initially inserted into a work bore.
Figure 2:
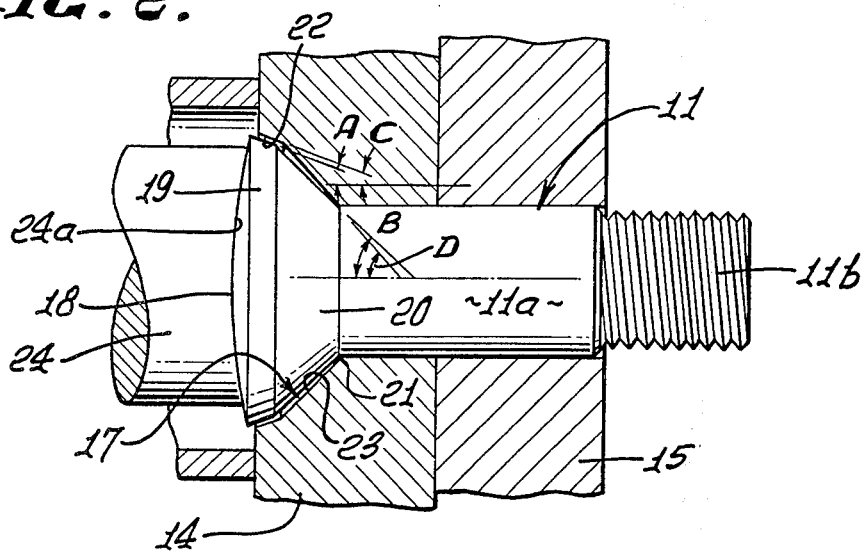
FIG. 2 is a view like FIG. 1, but showing the fastener after it has been partially seated.
Figure 3:
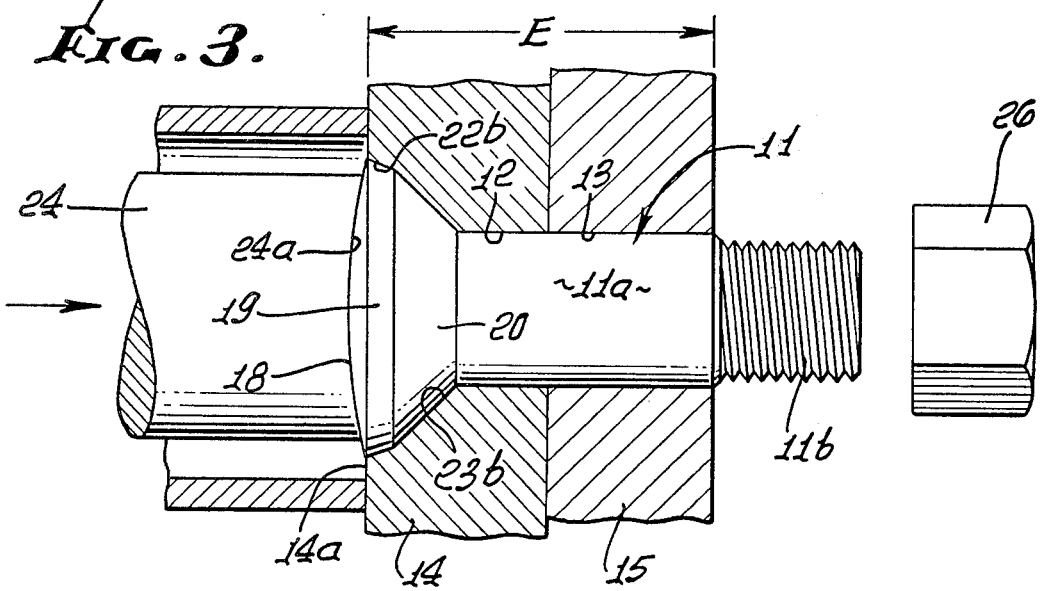
FIG. 3 is a view like FIG. 2.

In FIGS. 1–3, the fastener 10 has an axially extending shank 11 receivable in bores 12 and 13 formed by work panels or sheets 14 and 15 to be interconnected. The fastener also has a head 16 receivable in forcible engagement with work material forming a tapered counterbore generally indicated at 17, and which is typically countersunk. The fastener may for example consist of steel containing a suitable alloy or alloys (as for example chromium, nickel or molybdenum), or of titanium; and, the work may for example consist principally of aluminum or titanium, or aluminum or titanium alloys, The head 16 has an end face 18, a first forwardly tapered section 19 located immediately forwardly of the end face, and second forwardly tapered section 20 located forwardly of the first section. The taper anularity B of the second section substantially exceeds the taper angularity A at the first section, so that when the fastener shank is partially inserted into the work bore as seen in FIG. 1 (with interference fit as will be described), and a first impact is imparted to the head rear face, the fastener becomes partially seated as seen in FIG. 2. As there shown, only the forewardmost extent of the head initially engages the work counterbore, i.e. at 21, whereby a slight gap remains between the head section 19 and the counterbore first tapered surface 22, (of taper angularity C) and between the major extent of the head second section 20 and the major extent of the counterbore second tapered surface 23 (of taper angularity D). That gap is filled by cold worked material during the second impact to be described. In certain cases a single impact serves to drive the fastener from FIG. 1 to FIG. 3 positions.

A striker to impact the head is indicated generally at 24 as having an end face 24a which is shallowly concave to match the shallow convexity of the head rear face 18, for centering the fastener. A tubular spacer 25 surrounds the striker, and engages the work. Such apparatus is described in detail in my copending application Ser. No. 379,106 entitled, "Fastener Driving Gun" now abandoned. The construction of the fastener is such that it may normally be fully seated, as seen in FIG. 3, in response to one or two impacts imparted by such a striker, whereby there is no necessity for repeatedly striking the fastener head, thereby greatly reducing the noise level in aircraft frame assembly areas where large number of fasteners are being simultaneously driven. In this connection, the fastener shank 11 typically includes a primary section 11a extending forwardly of the head second section 20, and a secondary section 11b which is threaded and extends forwardly of the section 11a to receive a nut 26 to retain the fastener in work panel connecting position as seen in FIG. 3. The overall thickness dimension E of the work panel may typically vary from about 3/16 inch to 2½ inches.

For best results, and in regard to the fastener, the taper angularities A and C are typically the same, and may vary between 2° and 15°; when A is about 2°, the length L of the first section is about 0.140 inches; when A is about 15° the length L is about 0.010 inches (i.e. the greater the angle A, the shorter the length L) and these two coordinates (2° and 0.140 inches, and 15° and 0.010 inches) define a line in a rectangular coordinate system which relates L to A.

In addition, the fastener head first section 19 has interference engagement with the counterbore surface 22 everywhere along the length of shoulder 19, the total amount of such interference being within the range 0.002 and 0.010 inch; and the fastener shank primary section 11a has interference engagement with the bores 12 and 13, the total amount of such interference likewise being within the range 0.002 and 0.010 inch.

Finally, the counterbore second taper D always exceeds taper B; at the annular corner where tapers 22 and 23 meet, (and which is engaged by the annular corner where tapers 19 and 20 meet) up to 0.004 inch of cold working of the material of panel 14 occurs; and at the corner where taper 23 meets bore 12, (which corner is engaged by the corner where taper 19 meets shank 11a) up to 0.012 inch of cold working of the panel material takes place; however the amount of cold work at the second mentioned corner is always greater than at the first mentioned corner so that the material cold works or extrudes in a direction from the corner where taper 23 meets bore 12 toward the corner where tapers 22 and 23 meet and fills the gap.

The broken lines 22a and 23a in FIG. 1 show the ultimately deformed positions of the respective tapered surfaces 22 and 23 of the work. FIG. 3 shows the head first and second sections 19 and 20 having full sealing interference engagement with the work deformed first and second counterbore tapers 22b and 23b respectively, to block intrusion of corrosive material from the work surface. Also, the fastener end face 18 is substantially flush with the work surface 14a.

A further advantage accruing from the invention concerns prevention of bowing or warping of the work panel. Such detrimental warpage has commonly occurred in the past where a number of conventional angle headed fasteners were driven into the work, each fastener having shank interference with its work bore, but no interference between the fastener head and the surrounding countersunk work material. The present invention provides interference with the work along both the head and the shank, so that significant warpage creating by differential forces is not present along the length of the bore.

FIGS. 4–6 illustrate a form of the invention in which warpage prevention or minimization is of particular importance, i.e. where the fastener shank is tapered. Tapered shank fasteners have many advantages, as described in U.S. Pat. No. 3,034,611 to Zenzic; however, they can result in sheet or panel warpage, as for example is illustrated, with exaggeration in FIG. 7. As there shown, Zenzic type fasteners 34 attach skins or sheets 35 and 36 together, the tapered shanks 37 having interference engagement with the entireties of bores 38 in panel 36 closest the serrated nuts 39; however, the shanks 37 have interference engagement with only portions of bores 40, of reduced length relative to bores 38 (i.e. between heads 41 and interface 50) the tapered heads 41 of the fasteners being received into countersunk recesses 42 in sheet 35. As a result, the panel 36 is subjected to stretching in the direction 43 of the row of fasteners, and to greater extent than the stretch of panel 35 in that directions, so that bowing or warpage tends to occur, with resultant undesirable increase in axial loading on the tapered heads 41.

In accordance with the invention as illustrated in FIGS. 4–6, the fastener 51 has an axially forwardly extending shank 52 initially receivable into engagement with similarly tapered, unexpanded bores 53 and 54 in work panels, sheets or skins 55 and 56. Ultimate compressive expansion of the bores by the shank is indicated by broken bore lines 53a and 54a in FIG. 5. The forward end extent of the fastener may be suitable threaded, as at 57, for reception of a nut 58, which is rotatable to draw the fastener into fully advanced position as shown in FIG. 6. Internal threading on the nut bore is indicated at 59. Alternatively, the fastener forward end may be upset or otherwise attached to the work.

The fastener includes a head 60 having a rearwardly facing end face 61, a first forwardly tapered (i.e. frustoconical) section 62 located immediately forwardly of end face 61, and a second forwardly tapering (i.e. frusto-conical) section 63. As before, the taper angularity F of the second section 63 substantially exceeds the taper angularity E of the first section 62; also, the head taper E and the shank taper G are such as to provide interference engagement with the work at axially spaced locations (i.e. locus of engagement of shank with bores 53 and 54, and locus of engagement of head section 62 with annular bore 65) to minimize warpage of the work. For example, in the FIG. 6 section, the shank engagement with the bores 53 and 54 may be considered as producing counterclockwise "warpage producing" moments 66, and the engagement of head section 62 with the work may be considered as producing clockwise moments 67 substantially balancing moments 66.

In a preferred example, the shank taper is about 0.250 inches per foot along the tapered shank length; the taper angularity E of the head first section 62 is between 2° and 15° and the axial length of the head first section 62 is between 0.010 and 0.140 inches for fasteners whose head diameters varies between 3/16 and 1¼ inch; and the total of the interference between the section 62 and the countersunk bore 65 is between substantially 0.002 and 0.010 inch. Also, the total of the interference between shank 52 and each of the bores 53 and 54 is between substantially 0.002 and 0.010 inch. Broken line 65a in FIG. 5 indicates the ultimate expansion of the bore 65 by the head section 62, as the fastener is displaced to FIG. 6 position. If desired, force or impact may be applied to the head surface 61 in the direction of arrow 70, to displace the fastener forwardly from FIG. 5 to FIG. 6 position, and nut 58 may then be tightened on thread 57, and to engage surface 56a of panel 56. Alternatively, the nut may pull the fastener in to fully installed position.

In FIG. 6, the frusto-conical section 63 seats against corresponding frusto-conical bore 72 of panel 55, to limit further forward travel of the fastener.

It is found that the fatigue lives of fasteners, i.e. cycles to failure, can be greatly extended through use of the present invention.

Note in FIG. 8 that the resultant force $F_1$ in a representative direction Y, created by interference between the head taper 62 and work counterbore 65, should be sufficient to produce the balancing clockwise moment 67 referred to above. Force $F_1$ represents a summation of Y direction components or radial interference forces, across the span $d$, which is substantially equal to the head diameter at the taper 62. Two such radial interference forces are indicated at $f_1$ and $f_2$, and their Y direction components at $f_{1y}$ and $f_{2y}$. Other resultant forces in FIG. 8 are tabulated as follows:

| force | direction |
|---|---|
| $F_2$ | $-Y$ |
| $F_3$ | $X$ |
| $F_4$ | $-X$ |

Resultant forces $F_2$, $F_3$ and $F_4$ should also be sufficient to balance or substantially balance corresponding clockwise moments in associated planes and corresponding to moment 67.

I claim:

1. In combination with a workpiece having a bore and counterbore, the counterbore having first and second frusto-conical extents, a. a fastener having an axially extending shank received in said work bore and defining an axis, and a head received in forcible engagement with work material forming said counterbore, b. the head having an end face, a first forwardly tapered frusto-conical section located forwardly of said end face and a second forwardly tapered frusto-conical section located forwardly of the first section, the axial length and taper angularity of the second section substantially exceeding the axial length and taper angularity respectively of the first section, the taper angularities being measured from said axis, c. the shank tapered forwardly along its work bore engaging extent, the bore also being forwardly tapered, d. the shank having annular interference engagement with the bore at one axial location to produce a counterclockwise moment in the work, the head first tapered section also having annular interference engagement with the counterbore first frusto-conical extent at another axial location to produce a counterbalancing clockwise moment in the work, said interferences being predetermined and said locations being axially spaced to minimize warpage of the work.

2. The fastener of claim 1 wherein the head second section taper is free of interference engagement with the work counterbore second frusto-conical extent.

3. The fastener of claim 1 wherein the total of said interference between the head first section and the work counterbore first frusto-conical extent is between substantially 0.002 and 0.010 inch, and the total interference between the shank and work bore is between substantially 0.002 and 0.010 inch.

* * * * *